April 14, 1925.

J. A. KENNEDY

FLOODGATE

Filed June 7, 1924

Inventor
John A. Kennedy,
By
His Atty.

Patented Apr. 14, 1925.

1,533,921

UNITED STATES PATENT OFFICE.

JOHN A. KENNEDY, OF TOPEKA, KANSAS.

FLOODGATE.

Application filed June 7, 1924. Serial No. 718,536.

*To all whom it may concern:*

Be it known that JOHN A. KENNEDY, a citizen of the United States of America, residing at Topeka, in the county of Shawnee and State of Kansas, has invented new and useful Improvements in Floodgates, of which the following is a specification.

Where a stream runs through a pasture with the fence stopping on each side of the stream, the cattle very often, while standing in the stream, wander up-stream and come out on the other side of the fence in an adjoining pasture, and with this in view it is the purpose of the present invention to provide a flood gate to be mounted transversely of the stream to close the gap between the terminals of the fence on each side of the stream to prevent the cattle from wandering into an adjoining pasture.

Another purpose is to provide a flood gate including gate sections hingedly and yieldably mounted and capable of free but yieldable movements in the direction of the flow of the stream, allowing heavy collections of débris to pass and yet preventing the cattle from wandering up-stream due to the provision of abutments which prevent the gate sections from moving in the opposite direction. Light collections of débris, such as trash and the like, may be retained by the gate sections and thereby keep the stream below the gate clear for the cattle. Periodically, the débris may be easily removed to avoid excessive accumulation thereof.

Still another purpose is to provide a flood gate wherein each gate section consists of a tensioned spindle or shaft with means thereon for regulating the tensioning means in order to increase or decrease the resistance to the débris.

It is to be understood that the particulars herein given are in no way limitative and that, while still keeping within the scope of the invention, any desired modifications of detail and desired proportions may be made in the apparatus according to the circumstances.

The invention comprises further features and combinations of parts to be hereinafter set forth, shown in the drawings and claimed.

Figure 1:
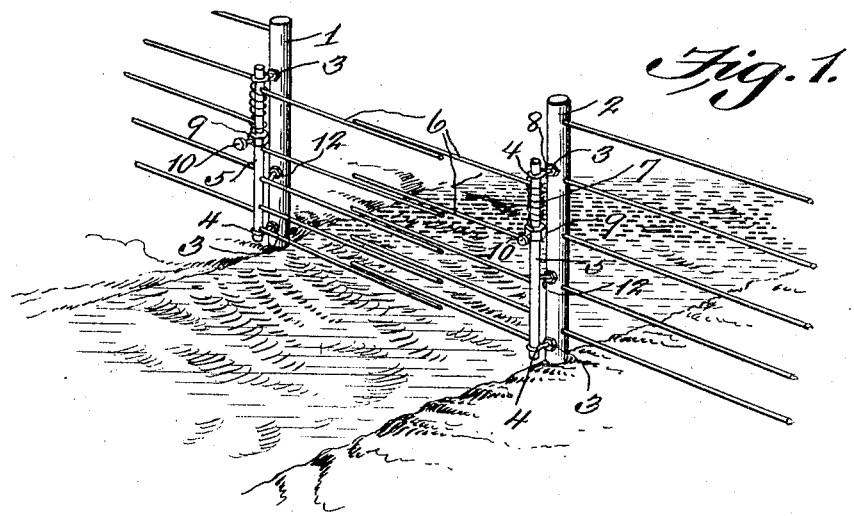
Figure 1 is a view of a portion of a stream showing the improved flood gate applied in accordance with the invention.
Figure 2:
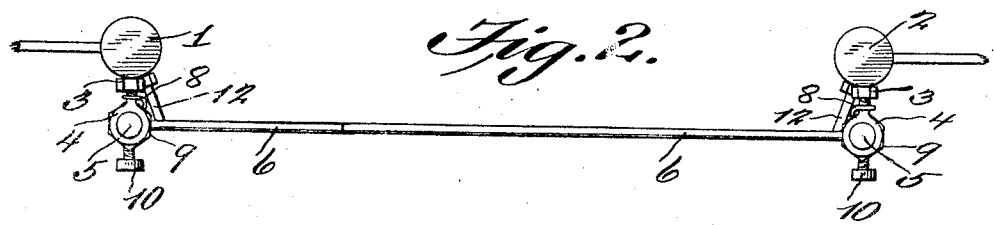
Figure 2 is a plan view of the gate, more clearly showing the attachment of a spring for tensioning the gate section.
Figure 3:
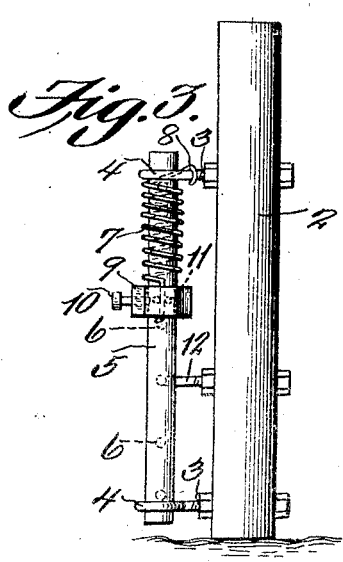
Figure 3 is a view in side elevation of one of the posts and a gate spindle, showing the mounting of the spring.
Figure 4:
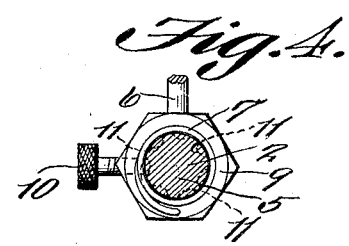
Figure 4 is a cross sectional view through a spindle showing the nut to which one end of the spring is connected.

Referring to the drawings, 1 and 2 designate posts or standards which are mounted in the bed of the stream, one on each side thereof, and anchored in any suitable manner to the posts or standards, for instance as at 3, are bearings 4 in the form of eyes for the reception of rocking spindles 5. Projecting laterally from the spindles 5 are gate bars or rods 6 which interengage as shown, preferably in Figure 1, and which constitute the flood gate sections, acting to close the gap between the terminals of the fence on the opposite sides of the stream.

Surrounding the upper portions of the spindles are relatively heavy tension coil springs 7, the upper ends of which are attached, as at 8, to the shanks of the upper bearings, while their other or lower ends are turned downwardly and pass through nuts 9 which are mounted upon the spindles. The nuts are provided with set-screws 10 which engage with any of the slight depressions 11 formed around the surfaces of the spindles. Obviously, the nuts can be adjusted and then secured in adjusted or set positions by the set-screws for the purpose of increasing or decreasing the tension of the relatively heavy coil springs.

The greater the tension of the coil springs, the greater the resistance offered to the débris that may collect in front of the gate sections. Suitable abutments 12 are attached to the posts which support the gate sections and are adapted to be engaged by certain of the rods or bars of the gate sections to limit the gate sections in alignment with each other. It is obvious that the gate sections are capable of opening movement in one direction and incapable of movement in the opposite direction, that is, the opposite direction from the normal positions of the gate sections. In this way, the gate sections will open with the direction of the flow of the stream, especially during the time the stream overflows its banks.

The scheme of preventing the gate sections from opening in a direction opposite to the flow of the stream is particularly essential to prevent cattle from wandering up-stream and thereby gaining access to an adjoining pasture. It is obvious that the tension springs may be regulated so as to permit the gate sections to freely open under the force of the débris that may collect.

The invention having been set forth, what is claimed is:

1. A flood gate comprising standards, one on each side of a stream, gate sections with vertical spindles rockably mounted on the standards and adapted to align with each other for the purpose of closing a gap in a fence ending on each side of the stream, projecting abutments on the standards for limiting the gate sections in alignment, and means on the spindles for tensioning the gate sections to hold them against the abutments.

2. In a flood gate, the combination with standards, one on each side of a stream, and provided with lateral bearings, of gate sections including spindles mounted in said bearings and having gate bars which intermesh in alignment with a fence ending on opposite sides of the stream, springs mounted upon the spindles of the gate sections and having their upper ends attached to certain of the bearings, members adjustably secured to the spindles and to which the lower ends of the springs are attached, thereby tensioning the gate sections and holding the gate bars intermeshed in alignment with the fence, and abutments carried by the standards with which the gate sections engage to limit the gate sections in alignment with the fence.

In testimony whereof he affixes his signature.

JOHN A. KENNEDY.